(12) United States Patent
Verma et al.

(10) Patent No.: US 12,464,076 B2
(45) Date of Patent: Nov. 4, 2025

(54) GENERATING AND PROCESSING CHARGING DATA RECORDS BASED ON PREDICTED RECORD LENGTH

(71) Applicant: Microsoft Technology Licensing, LLC, Redmond, WA (US)

(72) Inventors: Devesh Verma, Delhi (IN); Krishnakumar Vijayan, Bangalore (IN); Kumar Arakere Basavaraj, Bangalore (IN); Girish R. Nair, Nashua, NH (US); Arthur J. Barabell, Sudbury, MA (US); Venki Reddy Pulicherla, Bangalore (IN); Abhishek Kumar Sinha, Bangalore (IN); Basant Kumar, Bangalore (IN); Pikan Ghosh, West Bengal (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 380 days.

(21) Appl. No.: 18/306,060

(22) Filed: Apr. 24, 2023

(65) Prior Publication Data
US 2024/0137446 A1    Apr. 25, 2024
US 2024/0236239 A9    Jul. 11, 2024

(30) Foreign Application Priority Data

Oct. 20, 2022   (IN) .............................. 202241059931

(51) Int. Cl.
*H04M 15/00*    (2024.01)
*H04W 4/24*    (2018.01)

(52) U.S. Cl.
CPC ............. *H04M 15/41* (2013.01); *H04W 4/24* (2013.01)

(58) Field of Classification Search
CPC ...... H04M 15/41; H04M 15/58; H04M 15/65; H04M 15/67; H04M 15/8016; H04W 4/24; H04L 12/14
(Continued)

(56) References Cited

U.S. PATENT DOCUMENTS

| 2015/0133081 A1* | 5/2015 | Griot ..................... H04M 15/58 455/552.1 |
| 2020/0244555 A1 | 7/2020 | Caldwell |

(Continued)

FOREIGN PATENT DOCUMENTS

EP    3567799 A1    11/2019

OTHER PUBLICATIONS

International Search Report and Written Opinion received for PCT Application No. PCT/US2023/031807, Dec. 15, 2023, 16 pages.

*Primary Examiner* — Huy C Ho
(74) *Attorney, Agent, or Firm* — Ray Quinney & Nebeker P.C.; James S. Bullough

(57) ABSTRACT

The present disclosure generally relates to systems, methods, and computer-readable media for managing the generation and processing of charging data records (CDRs) in a telecommunication environment (e.g., a fourth generation (4G) a fifth generation (5G), or future generation mobile network). The systems described herein involve predicting lengths of CDRs prior to encoding and providing the CDRs to a charging gateway function to ensure that the CDRs do not exceed a maximum allowable length that the charging gateway function is capable of processing while also reducing the total number of CDR packages that are encoded and transmitted. Indeed, the systems described herein can predict the length of the CDRs incrementally as charging containers are added, thus limiting the number of CDRs that are generated and processed.

20 Claims, 6 Drawing Sheets

(58) Field of Classification Search
USPC .......................................................... 455/406
See application file for complete search history.

(56) References Cited

U.S. PATENT DOCUMENTS

2020/0404105 A1\* 12/2020 Kim ...................... H04M 15/70
2021/0377703 A1\* 12/2021 Jardon ................... H04W 4/24

\* cited by examiner

GENERATING AND PROCESSING CHARGING DATA RECORDS BASED ON PREDICTED RECORD LENGTH

CROSS-REFERENCE TO RELATED APPLICATIONS

This application is related to and claims priority to Indian Provisional Patent Application No. 202241059931, filed Oct. 20, 2022, the entirety of which is hereby incorporated by reference.

BACKGROUND

Cellular networks can provide computing devices (e.g., mobile devices) with access to services available from one or more data networks. A cellular network is typically distributed over geographical areas that include one or more base stations and core network devices that provide a cell with network coverage. The devices of the cellular network provide reliable access to a data network by mobile devices over a wide geographic area. In many instances these cellular networks provide mobile devices access to the cloud.

As noted above, cellular networks include a number of network components. For example, cellular networks often include a radio access network (RAN) and a core network. The RAN may include base stations that communicate wirelessly with user devices (e.g., mobile devices) and facilitate interaction with components of a core network. The core network may provide access to services and data available from one or more external networks. As noted above, cellular networks are often used to provide Internet connectivity to mobile devices.

As will be discussed in further detail herein, a core network may provide a variety of functions, including functions and services that provide Internet protocol (IP) connectivity for both data and voice services, ensuring this connectivity fulfills the promised QoS requirements, ensuring that user devices are properly authenticated, tracking user mobility to ensure uninterrupted service, and tracking subscriber usage for billing and charging.

Core networks will often include nodes that generate charging data records (CDRs) that may be used for subscriber billing and analytics. These CDRs are typically generated and provided to functions (e.g., charging gateway functions) that are tasked with processing the CDRs. As cellular networks have grown and as data on which charging records rely has become more complex, there have arisen a number of difficulties in conventional techniques for processing these CDRs. Indeed, as the number and variety of cloud-based applications and services have increased, it has become desirable to improve techniques for maintaining and processing charging records associated with use of cellular networks and cloud computing resources.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

DETAILED DESCRIPTION

Figure 1:
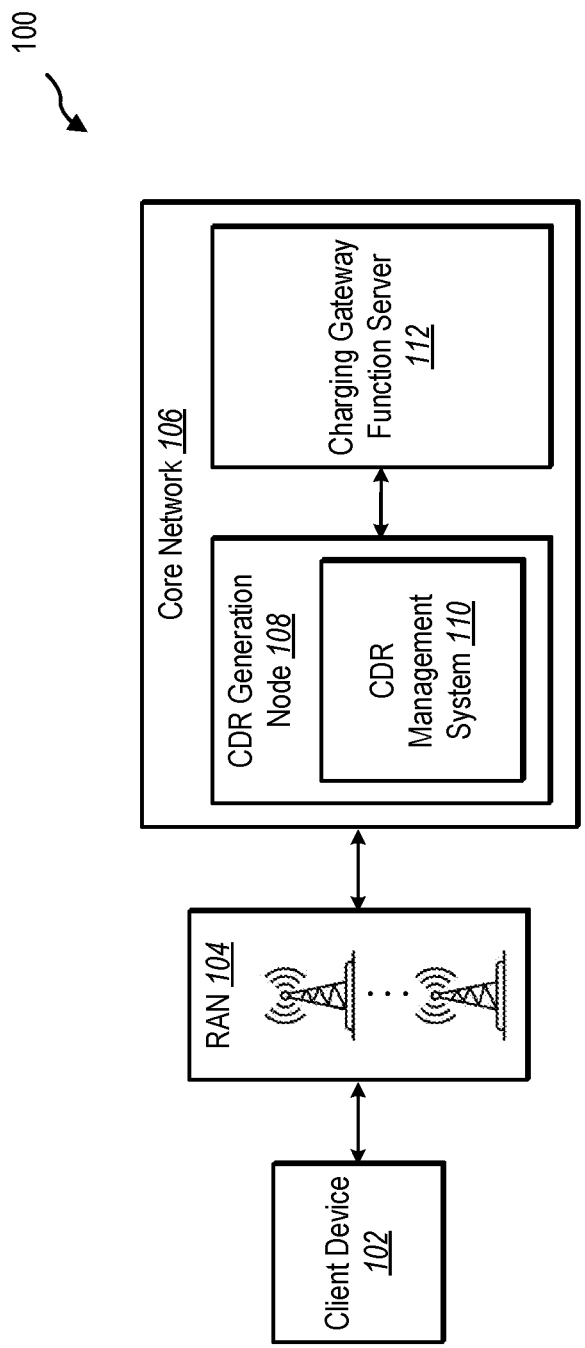
FIG. 1 illustrates an example cellular network environment including a CDR generator node implemented thereon in accordance with one or more embodiments.

The present disclosure generally relates to systems, methods, and computer-readable media for managing generation of charging data records (CDRs), predicting sizes of the CDRs, and selectively processing the data records based on the predicted sizes of the CDRs within a cellular network environment. The systems described herein involve features of a CDR management system for predicting a size of a CDR and determining, based on the predicted size, when to provide the CDR to a charging gateway function (CGF) for processing. As will be discussed in further detail below, the features and functionality of the CDR management system may be implemented in a cellular network environment to implement charges and quota enforcements on the cellular network environment in an efficient and effective manner. While one or more embodiments described herein may refer specifically to a $3^{rd}$ generation partnership project (3GPP) environment, such as fifth generation (5G) and beyond, the features and functionality of the CDR management system may be implemented in any cellular network environment on which applications and services are tracked for charging, enforcing quotas, or otherwise tracking usage of devices on the network.

As an illustrative example, the CDR management system may be implemented in a telecommunication environment in which CDRs are generated and processed. In one or more embodiments described herein, the CDR management system may identify a usage event, such as a closing of a charging container associated with usage of one or more telecommunication resources. The CDR management system may determine a predicted size of a CDR transmission based on information of the usage event, such as a predicted size of a container associated with the usage event. The CDR management system may generate a CDR based on a determination of the predicted size of the CDR transmission exceeding a threshold size. The CDR management system may transmit the CDR to a charging gateway function (CGF) for processing.

As will be discussed herein, the present disclosure includes a number of practical applications having features described herein that provide benefits and/or solve problems associated with generating and processing CDRs in a telecommunication environment. Some example benefits are discussed herein in connection with features and functionalities provided by a CDR management system. It will be appreciated that benefits discussed herein are provided by way of example and are not intended to be an exhausting list of all possible benefits of the CDR management system.

For example, by determining a predicted size of a CDR, the CDR management system can avoid communicating a CDR to a CGF server that the CGF server is incapable of processing. Indeed, because CGFs are often unable to process CDRs over a certain size, processing larger CDRs can result in loss of data, inaccurate charges or quota enforcement, and/or some charging requests inadvertently being blocked.

In addition, even where a CDR processing environment may have awareness of the inability of a CGF server to process CDRs above a certain size, many conventional approaches involve encoding the CDRs even where the CDR is of a size that the CGF server is unable to process. This unnecessary encoding results in overutilization of processing resources, monopolization of processing bandwidth, and delays in CDR processing. In contrast, the CDR management system predicts the size of the CDR prior to encoding, which reduces the number of CDRs that would be encoded without then being processed by a CGF server. This reduction in the number of CDRs that are encoded can significantly reduce the number of processing resources that are needed when encoding and ultimately processing CDRs.

As will be described in further detail below, the CDR management system may additionally provide benefits associated with efficient processing of CDRs. For example, the CDR management system provides features that more efficiently group charging containers within individual CDRs. The CDR management system additionally implements an event-driven prediction mechanism that allows the CDR management system to incrementally determine when a CDR is approaching a maximum size, further optimizing the generation of CDRs prior to encoding and processing the individual requests.

As illustrated in the foregoing discussion and as will be discussed in further detail herein, the present disclosure utilizes a variety of terms to describe features and advantages of methods and systems described herein. Some of these terms will be discussed in further detail below.

As used herein, a "cloud computing system" or "distributed computing system" may be used interchangeably to refer to a network of connected computing devices that provide various services to computing devices (e.g., customer devices). For instance, as mentioned above, a cloud computing system can include a collection of physical server devices (e.g., server nodes) organized in a hierarchical structure including clusters, computing zones, virtual local area networks (VLANs), racks, fault domains, etc. In one or more embodiments described herein a portion of the cellular network (e.g., a core network) may be implemented in whole or in part on a cloud computing system. In one or more embodiments a data network may be implemented on the same or on a different cloud computing network as the portion of the cellular network.

As used herein, a "CDR" or "CDR package" may be used interchangeably to refer to a data object with charging and other usage information contained within the data object for the purpose of charging, tracking, or otherwise enforcing usage policies within a telecommunication environment. In one or more embodiments described herein, a CDR may include one or more basic elements associated with a subscriber (e.g., a customer, client, or other entity for which usage or charging data applies). In addition, a CDR may include one or more containers (e.g., charging containers) including various metrics that are tracked in connection with usage of network resources by a subscriber.

As used herein, a "container" or "charging container" may refer to a measure of data over a duration of time. A container may indicate any information about the data and associated duration of time. For example, a container may include an amount of data, a quality of service (QoS) that was provided to a subscriber, a set of rules for a particular container, a type of data or traffic, etc. A container may have an applicable set of policies associated with charging the data. Indeed, a container may include a set of information including an amount of data and a time of data for a particular period of time. Containers can refer to different types of containers. In one or more embodiments described herein, a container refers specifically to a charging container, referring to a component of a CDR.

Additional details will now be provided regarding systems described herein in relation to illustrative figures portraying example implementations. For example, FIG. 1 illustrates an example environment 100 for implementing features and functionality of a CDR prediction and management system (or simply a "CDR management system") implemented on a CDR generator node. As shown in FIG. 1, the example environment 100 may refer to a telecommunication environment including a client device (e.g., a user equipment (UE)), a radio access network (RAN), and a core network. One or more features of the RAN and core network may be implemented on a cloud computing system.

As shown in FIG. 1, the environment 100 may include a client device 102. The client device 102 may refer to a variety of computing devices including, by way of example, a mobile device such as a mobile telephone, a smartphone, a personal digital assistant (PDA), a tablet, or a laptop. Alternatively, one or more of the client devices 102 may refer to non-mobile devices such as a desktop computer, a server device (e.g., an edge network server), or other non-portable devices. In one or more embodiments, a client device 102 may refer to an application or software construct on a computing device. Each of the devices of the environment 100 may include features and functionality described generally below in connection with FIG. 6.

As shown in FIG. 1, the client device 102 may communicate with the core network 106 via a radio access network 104. Indeed, as mentioned above, one more components of the environment 100 may be implemented within an architecture of a cellular network. For example, as noted above, a cellular network may include a radio access portion inclusive of a network of mobile towers (or base stations) in combination with components of a core network 106. Thus, as used herein, a cellular network may refer broadly to an architecture inclusive of the radio access network 104 including the mobile towers and computing nodes of the core network 106.

As noted above, the radio access network (RAN) 104 may include any number of RAN components, such as multiple mobile towers or base stations. In one or more embodiments described herein, the client device 102 may move between coverage areas associated with respective RAN components. In one or more embodiments described herein, this movement between coverage areas may constitute an event, such as a handoff between RAN components, that triggers closing of a charging container (or multiple charging containers that are being generated in parallel) and addition of the charging container(s) within a CDR. In one or more embodiments, the container closing event refers to detected movement of a subscriber device from a first coverage area associated with a first edge network (e.g., a first set of network devices on a first edge network and/or associated with a first base station) to a second coverage area associated with a second edge network (e.g., a second set of network devices on a second edge network and/or associated with a second base station).

Each of the client device 102, RAN 104, and components of the core network 106 may communicate via one or more networks. These networks may include one or more communication platforms or any technology for transmitting data. For example, a network may include the Internet or other data link that enables transport of electronic data between the client device 102, the RAN 104, and components of the core network 106. In one or more embodiments, some or all of the components of the core network 106 are implemented on a cloud computing system. In addition, one or more embodiments of the RAN components may be virtualized and/or otherwise implemented as part of a cloud computing system. In one or more embodiments, components of the RAN 104 and/or core network 106 may be implemented on an edge network that has virtual connections to the internal data center(s) of the cloud computing system.

As shown in FIG. 1, the environment 100 includes a core network 106, which may include any number of computing nodes implemented thereon. As shown in FIG. 1, the core network may include a CDR generation node 108 and a charging gateway function server 112. It will be understood that the core network 106 may include any number of network nodes having well defined purposes within the architecture of the core network 106. For simplicity in specifically describing features of the CDR management system 110, the core network will show a CDR generation node 108, which may be representative of one or multiple server nodes, as well as a charging gateway function server 112, which may similarly be representative of one or multiple server nodes.

As shown in FIG. 1, the CDR generation node includes a CDR management system 110 implemented thereon. The CDR generation node 108 may refer to one of a variety of nodes on the core network 106. For example, in one or more embodiments, the CDR generation node 108 may be a packet data network (PDN) gateway node. In some implementations, the CDR generation node 108 is a service gateway node. Indeed, the CDR generation node 108 may refer to any type of server node on which CDRs are generated and encoded prior to processing an encoded CDR.

As further shown in FIG. 1, the core network may include a charging gateway function server 112. The charging gateway function server 112 may refer to any server node on the core network 106 (or in communication with the core network) that is capable of receiving and processing a CDR. In one or more embodiments, the charging gateway function server 112 is implemented on a different server node from the CDR management system 110.

As will be discussed in further detail below, the CDR management system 110 may include features related to detecting a container closing event (e.g., an event that triggers closing one or more containers and adding the container(s) to the CDR), predicting the length of a CDR, and encoding the CDR. In addition, the charging gateway function server 112 may incorporate any features described herein related to receiving and processing a CDR having a size less than a maximum size that the charging gateway function server 112 is configured to process.

Additional detail in connection with generating a CDR, predicting a length of the CDR, and selectively encoding and transmitting the CDR for processing will now be discussed in connection with FIG. 2. Components shown in FIG. 2 may refer to example components as similarly-named components discussed above in connection with FIG. 1.

Figure 2:
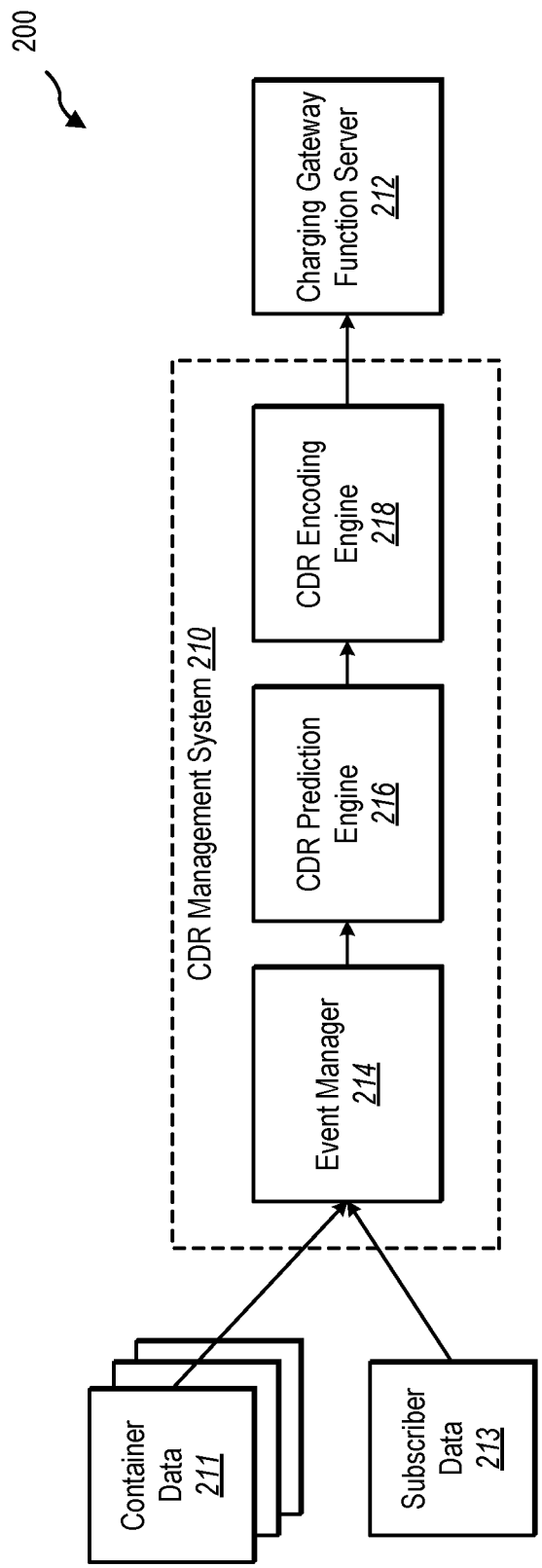
FIG. 2 illustrates an example workflow showing prediction of a CDR length in accordance with one or more embodiments.

FIG. 2 shows an example workflow 200 that may be performed by the CDR management system 210 in accordance with one or more embodiments. As shown in FIG. 2, the CDR management system may include an event manager 214. In one or more implementations, the event manager 214 receives container data 211 and subscriber data 213 for use in determining whether a container closing event has occurred. For example, the event manager 214 may receive, collect, or otherwise obtain subscriber data 213, which may include any information about an individual subscriber or subscriber account. The subscriber data 213 may include information about a particular client device and any information that is used in in connection with identifying a particular subscriber or device associated with corresponding usage data.

As further shown, the event manager 214 may receive container data 211, which may include any information associated with usage of network resources by a subscriber. As shown in FIG. 2, the event manager 214 may receive information associated with multiple containers concurrently based on different types of resource usage by a subscriber. For example, the multiple containers may include usage information associated with different types of resource usage, such as utilization of specific services, utilization over different periods of time, utilization of services at different qualities of service, or utilization associated with different rates (e.g., charging rates). Indeed, it will be appreciated that the event manager 214 may concurrently collect container data 211 associated with any number of discrete charging containers over similar or overlapping periods of time.

In one or more embodiments, the event manager 214 is configured to detect certain container-closing events. For example, a container closing event may refer to some duration of time associated with a particular container. For instance, a container may refer to a specific type of resource utilization over one hour. Accordingly, the event manager 214 would detect that one hour has passed, and close the container for the corresponding type of resource utilization. As another example, a container closing event may refer to a maximum quantity of resource utilization for a particular time period. In this instance, the event manager 214 may detect a container closing event based on a subscriber using a threshold quantity of resources for a particular type of resource utilization and, in response, close the container. Indeed, it will be appreciated that the event manager 214 may be configured to recognize any of a variety of container closing events associated with quantities of resource utilization, timing of resource use, types of resource use, or any relevant combination of signals that the event manager 214 is trained to recognize in closing a charging container.

In one or more embodiments, the event manager 214 is configured to recognize or otherwise detect a container closing event that involves multiple containers (e.g., a multi-container closing event). For example, the event manager 214 may be configured to detect that a certain duration of time has passed and determine that multiple containers that are concurrently open should be closed and added to a CDR. As another example, the event manager 214 may be configured to detect some usage-based event, such as a handover event where a subscriber moves between coverage areas. In this example, the event manager 214 may close any containers that were compiling usage data over a previous time period based on movement of the subscriber (e.g., a subscriber device) between coverage areas (e.g., between a first and second mobile station). This event may be triggered based on different rates associated with the different coverage areas, or based on other criteria that would prompt closing of one or more containers to be included within a CDR.

As shown in FIG. 2, the CDR management system 210 may additionally include a CDR prediction engine 216. The CDR prediction engine 216 may be configured to predict a size (e.g., a length) of a CDR. As indicated above, this prediction may be performed prior to encoding the CDR and providing the CDR to the charging gateway function server 212. This prediction prior to encoding is beneficial for a number of reasons. For example, the CDR prediction engine 216 may determine that a charging gateway function server 212 is capable of processing the request prior to performing a computationally expensive encoding process. In addition, by incrementally predicting a CDR length, the CDR prediction engine 216 may prevent encoding a larger number of CDRs than would need to be encoded in accordance with one or more embodiments of the present disclosure.

The CDR prediction engine 216 may perform the prediction in a number of ways. For example, the CDR prediction engine 216 may predict length of different components that make up the CDR. For instance, a CDR may include a first set of subscriber elements that are associated with the subscriber and are generally independent from any number of containers that are included within the CDR. For example, the subscriber elements may include an access point name (APN) associated with the subscriber or subscriber device(s). The subscriber elements may additionally include an IP address, IMSI, MSISDN, ULI, QOS, etc.

The CDR may additionally include container elements, such as an identifier of the digital container(s) (SDC), identification of services that are associated with corresponding containers, as well as any information contained within the corresponding containers. As indicated above, a CDR may include information associated with multiple container elements.

In one or more embodiments, the CDR prediction engine 216 performs the prediction incrementally as the information is received. For example, the CDR prediction engine 216 may perform a first series of predictions on elements that are commonly included within a CDR independent of containers that are added thereto (e.g., the subscriber elements and/or additional elements that are fixed size or otherwise highly predictable). The CDR prediction engine 216 may then perform a prediction of CDR length in response to each container that is closed and considered for addition to the CDR. Indeed, the CDR prediction engine 216 may predict a length of a container element of the CDR in response to each container that is closed (e.g., as indicated by the event manager). Where multiple containers are closed at once, the CDR prediction engine 216 may perform a prediction on each of the containers individually or, alternatively, all at once.

By way of example, the CDR prediction engine 216 may consider a wide variety of features in determining a predicted length of a CDR. For example, the CDR prediction engine 216 may determine a predicted length based on elements that vary in a small range. This may include elements such as IP address (e.g., v4 or v6), IMSI, MSISDN, etc. (no. of digits), ULI, QOS, etc. This can be predicted in a narrow range with minimal computational overhead.

The CDR prediction engine 216 may additionally consider and predict for elements that have high variance, such as an APN name. The length for such elements is predicted on the basis of value of the string length with minimal computational overhead. In some instances, single elements may combine to form bigger containers (e.g., SDC). Because containers that cannot be split should be considered as a single unit, this prediction can be somewhat variable between different containers.

The CDR prediction engine 216 may further predict the length of all elements on a wire containing a single byte of type and length. Accordingly, two bytes for type and length may be added for all elements. For integers, the CDR prediction engine 216 may only consider as many bytes as are necessary for encoding the values to be used (e.g., for 0-255, one byte may be used while 256-65535, two bytes may be used). This can be computed with minimal computational resources.

In one or more embodiments, the specific mechanism for predicting a CDR length is summarized as follows. The CDR prediction engine 216 may use prediction for basic elements (e.g., IMSI, APN, etc.) to arrive at a base or fixed size of the CDR. The CDR prediction engine 216 may then perform additional predictions as new containers are added, using data mining and considering elements of the containers to arrive at a predicted size of the discrete container(s). The CDR prediction engine 216 may then add the size of the containers to the base or fixed size of the CDR and compare against a size limit. Where the size limit has been breached (or where a predetermined threshold size has been hit), the CDR prediction engine 216 may provide a signal indicating as such to the CDR encoding engine 218. Alternatively, if the size of the CDR is still below a predetermined threshold (e.g., 90%), the CDR prediction engine 216 may wait until a new container is received and again perform a prediction of the CDR size and add the size to the previously predicted size to determine if the threshold limit has been reached or surpassed. Additional information will be discussed below in connection with FIG. 3.

As noted above, in one or more embodiments, the CDR prediction engine 216 foregoes the analysis of the specific size based on a detected multi-container closing event. Indeed, while the CDR prediction engine 216 may predict the size and selectively cause the CDR to be processed where the size of the resulting CDR is within the desired size range, the CDR prediction engine 216 may nonetheless determine that the CDR should be encoded and processed based on the occurrence of a multi-container closing event (or other trigger that causes the CDR to be processed independent of the predicted size). Additional information will be discussed below in connection with FIG. 3.

As further shown in FIG. 2, the CDR management system 210 includes a CDR encoding engine 218. The CDR encoding engine 218 may perform an encoding process on the CDR that is predicted to be within a maximum size and capable of being processing by the charging gateway function server 212. More specifically, the CDR encoding engine 218 may perform an encoding process on the CDR that is predicted to be above a threshold limit, but within the maximum size of being processing by the charging gateway function server 212. In one or more embodiments, the CDR encoding engine 218 performs an encoding process that involves converting the CDR to a GTPP task and providing the encoded CDR in the appropriate protocol to the charging gateway function server 212.

Figure 3:
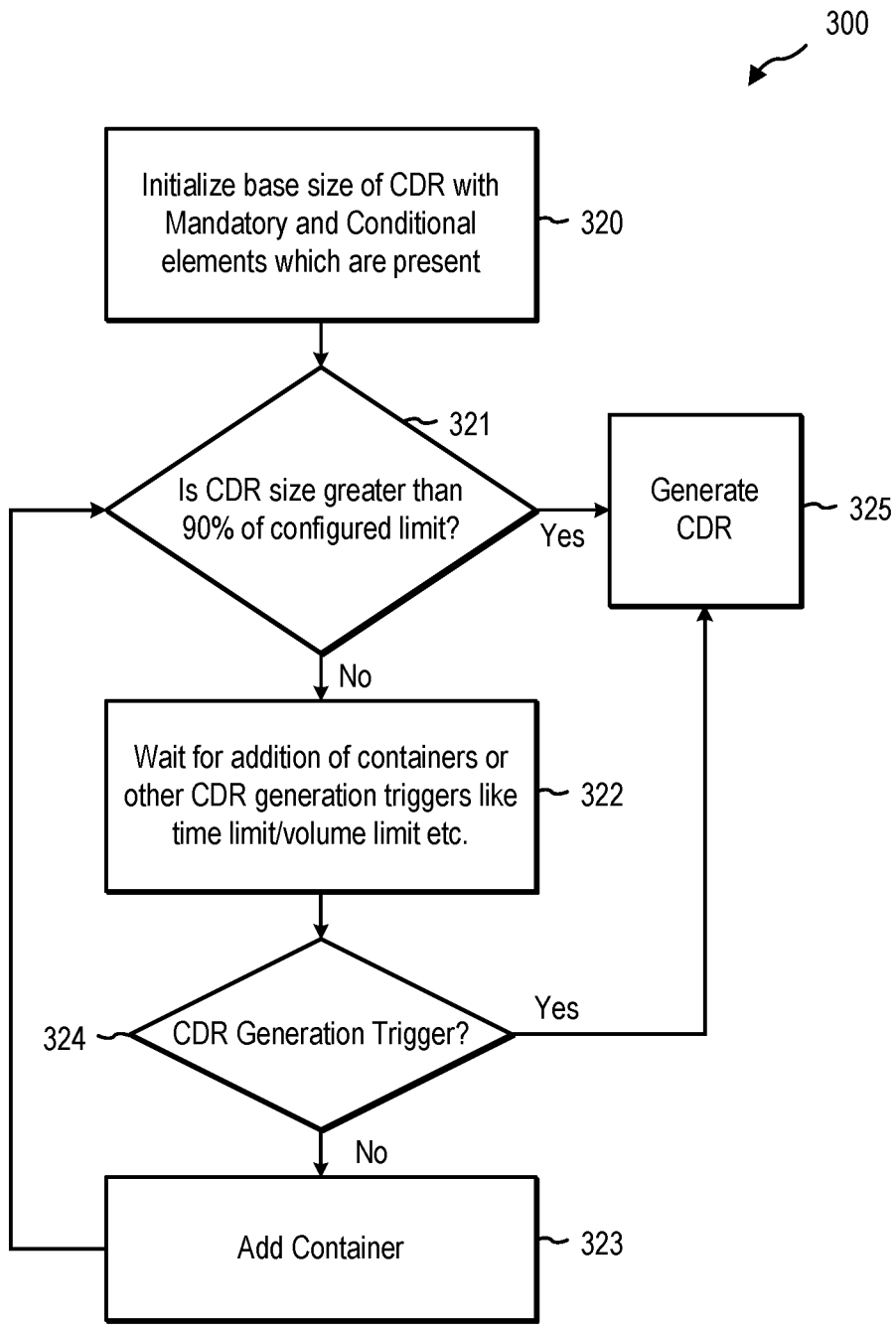
FIG. 3 illustrates an example series of acts related to predicting a size of a CDR pursuant to encoding and processing the CDR in accordance with one or more embodiments.

FIG. 3 illustrates an example series of acts 300 that may be performed by the CDR management system (e.g., the CDR management system 110, 210) in selectively encoding and providing the CDR to a charging gateway function server for processing. In one or more embodiments, the acts shown in FIG. 3 constitute a means for predicting and generating an encoded CDR. Nevertheless, it will be understood that one or more embodiments described herein may omit or add onto the specific acts shown in FIG. 3. For example, in one or more embodiments, the CDR management system may encode and transmit the CDRs based solely on the CDR exceeding a threshold length (while staying within a maximum processible length) and independent from at least one or more additional triggers discussed herein.

As shown in FIG. 3, the CDR management system may perform an act 320 of initializing a base size of a CDR with mandatory and conditional elements which are present. As indicated above, this may involve including subscriber elements and one or more container elements that are included in any (or at least most) CDRs.

As further shown, the CDR management system may perform an act 321 of determining if the CDR size (e.g., a predicted CDR size) is greater than a 90% configured limit. It will be noted that 90% is provided by way of example and may be configured at any percentage as may serve a particular policy. Other implementations may include more conservative limits (e.g., lower than 90%) or more aggressive limits (e.g., higher than 90%). In one or more embodiments, the CDR management system may determine the specific limit based on historical sizes of containers that are created within a particular telecommunication environment or in connection with a particular subscriber. In this example, where no containers have yet been added, the determination of the CDR size will likely be less than the 90% configured limit.

While not shown in FIG. 3, in addition to determining whether the CDR size is greater than a threshold limit, the CDR management system may additionally determine whether the CDR package size is less than or otherwise within a limit that the charging gateway function server can process. Indeed, while the threshold limit may be set to limit the number of incremental container additions that would cause the size of the CDR package to surpass the threshold limit and also exceed a maximum CDR package size that the charging gateway function can process, the CDR management system may nonetheless check that upon passing the threshold package size, the resulting CDR package would not exceed a maximum allowable package size that the charging gateway function server would be able to process. In the event that the CDR package size exceeds both the threshold configured size and a maximum allowable size that the charging gateway function can process, the CDR management system may instead provide a previous iteration of the CDR package and initiate generation of a new CDR package and further reiterating the series of acts 300 illustrated in FIG. 3.

As shown in FIG. 3, where the CDR size (e.g., the predicted CDR size) is less than the configured limit, the CDR management system may perform an act 322 of waiting for addition of containers or other CDR generation triggers (e.g., container closing events) such as limits on volume and/or time. As noted above, the CDR management system may detect closing of any container based on any combination of signals that trigger closing of the container and addition of the container to the CDR.

As shown in FIG. 3, the CDR management system may perform an act 324 of determining whether one of the other CDR generation triggers has occurred. More specifically, the CDR management system may determine whether a CDR generation trigger other than an addition of a container has occurred. These other CDR generation triggers may include some triggering event such as a handover or movement between coverage areas, a subscriber closing an account or logging off the network, or other detectable event. Indeed, the CDR management system may determine other CDR generation triggers based on any event for which generating the CDR is appropriate even where the length of the CDR has not yet reached the predetermined threshold (e.g., 90% of the configured limit).

As shown in FIG. 3, where the CDR management system determines that a CDR generation trigger has occurred, the CDR management system may perform an act 325 of generating the CDR (e.g., encode the CDR). The CDR management system may generate the CDR in response to a number of different events. For example, as shown in FIG. 3, the CDR management system may generate the CDR based on a determination (e.g., at act 321) that the CDR size is greater than 90% of the configured limit. As an alternative, the CDR management system may generate the CDR in response to detecting that the other CDR generation trigger has occurred (e.g., a CDR generation event other than simply adding a container to the CDR package).

In the alternative, where the CDR generation trigger is not detected, but where an event that involves adding a container to the CDR is identified, the CDR management system may perform an act 323 of adding the container to the CDR. In this example, the CDR management system may predict a new (e.g., updated) size of the CDR and return to the act 321 of determining whether the CDR size is greater than the 90% configured limit. Where the CDR size is still less than the configured limit, the CDR management system may again perform the act 322 of waiting for addition of further containers, as shown in FIG. 3, and iterate through the acts 322-324 any number of times until determining that the CDR size is larger than the configured limit (or until another CDR generating event has been detected).

Figure 4A:
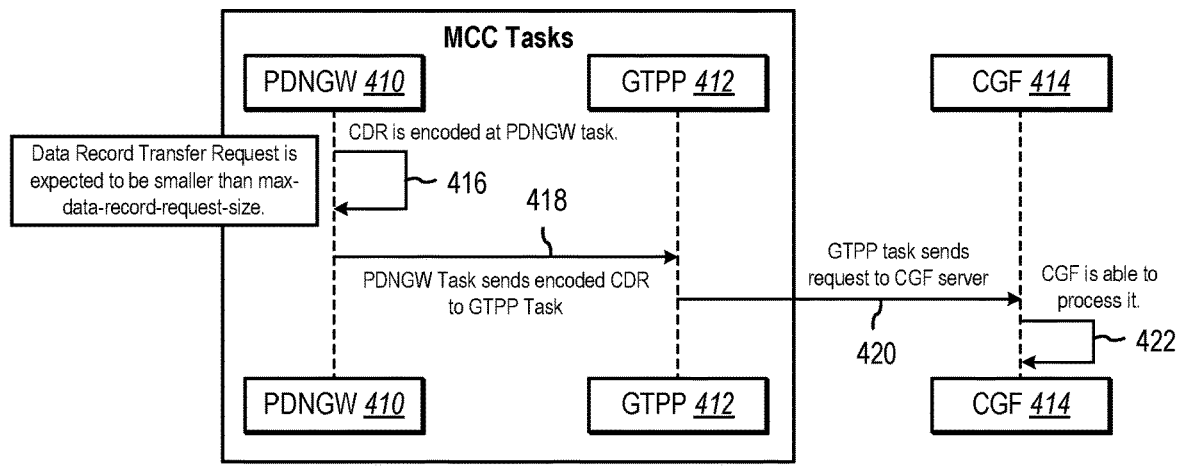
FIGS. 4A-4B illustrate an example environment within a core network within which a CDR size may be predicted and processed in accordance with one or more embodiments.
Figure 4B:
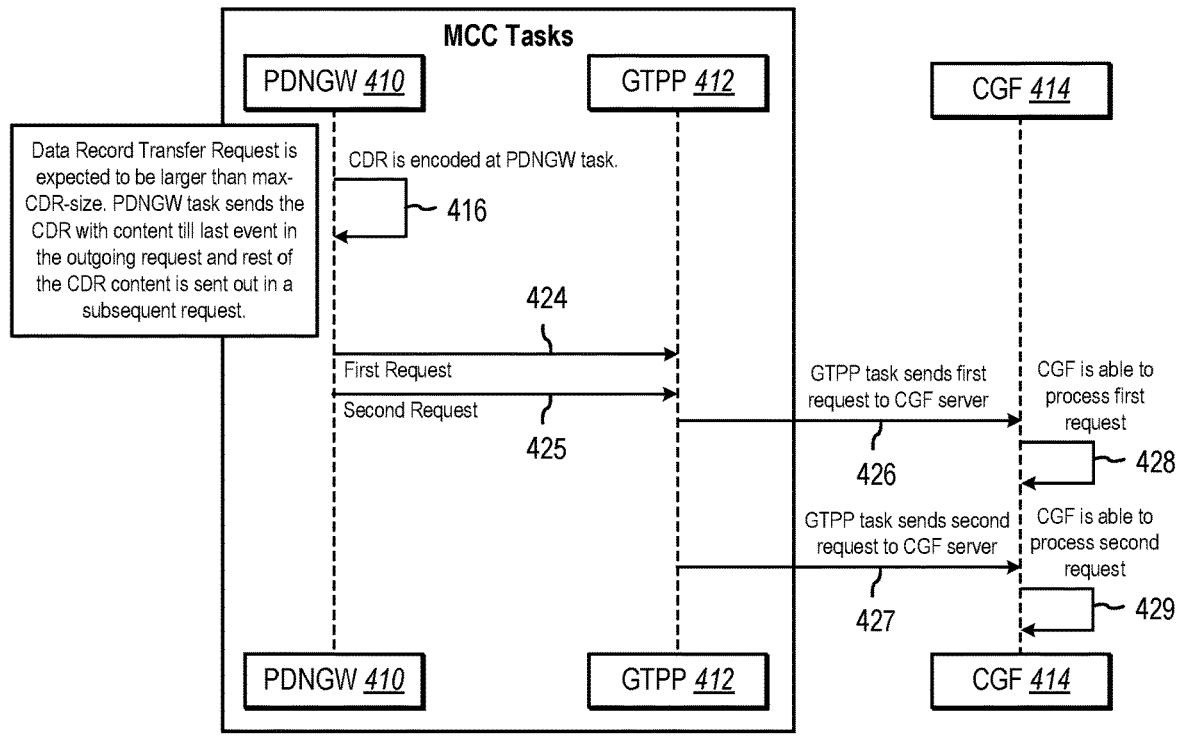

FIGS. 4A-4B illustrate examples showing additional detail in connection with example environments in which the CDR management system may be implemented. For example, FIG. 4A illustrates a first example environment 402 showing an example implementation in which the CDR management system prompts generation of a CDR based on the CDR not exceeding a maximum threshold (e.g., a configuration limit) of the charging gateway function. In this example, the CDR management system may be implemented as part of an MCC task, and specifically within a PDN gateway (PDNGW).

As shown in FIG. 4A, the PDNGW task 410 may determine (e.g., predict) at 416 that the CDR is smaller than a maximum configuration of the charging gateway function (CGF) 414. Consistent with one or more embodiments described herein, this may be based on the size of the CDR being larger than some threshold value (e.g., 90% of the configuration max), but smaller than a maximum configuration threshold (e.g., 100% of the configuration max). The PDNGW task 410 may send, at 418, the encoded CDR to a GTPP task 412. The GTPP task 412 may send the request, at 420, to the CGF 414. The CGF 414 may then process the CDR at 422. In one or more embodiments, the GTPP task 412 performs a final check that the CDR does not violate a permissible length prior to providing the CDR to the CGF 414.

In one or more embodiments, the CDR management system may generate multiple requests, such as in the event that the addition of a container causes the size of the predicted CDR to exceed some maximum threshold. This may occur because an individual container is large and causes the size of the CDR to not only exceed a threshold limit (e.g., 90%), but also move beyond a maximum configuration limit of the CGF 414 to process the CDR. As another example, this may occur in response to a multi-container closing event where the addition of multiple containers would cause the size of the CDR to exceed a maximum configuration limit of the CGF 414. As shown in FIG. 4B, this example is discussed in a similar environment discussed above in connection with FIG. 4A.

FIG. 4B illustrates another example environment 404 showing an example implementation of the CDR management system. As shown in FIG. 4B, the PDNGW task 410 may determine that a CDR is expected to be larger than a maximum CDR size at 416. The PDNGW task 410 may send the CDR with content till last event in the outgoing request and rest of the CDR content is sent out in a subsequent request. As shown in FIG. 4B, the PDNGW task 410 may encode the CDR and generate two individual requests. The PDNGW task 410 may provide a first request at 424 and second request 425 to a GTPP task 412. The GTPP task 412 may send the first request, at 426 to the CGF 414 and cause the CGF 414 to process the first request at 428. As further shown, the GTPP task 412 may send the second request at 427 to the CGF 414 and cause the CGF 414 to process the second request at 429. In one or more embodiments, the GTPP task 412 performs a final check that the CDR does not violate a permissible length prior to providing the CDR to the CGF 414.

Figure 5:
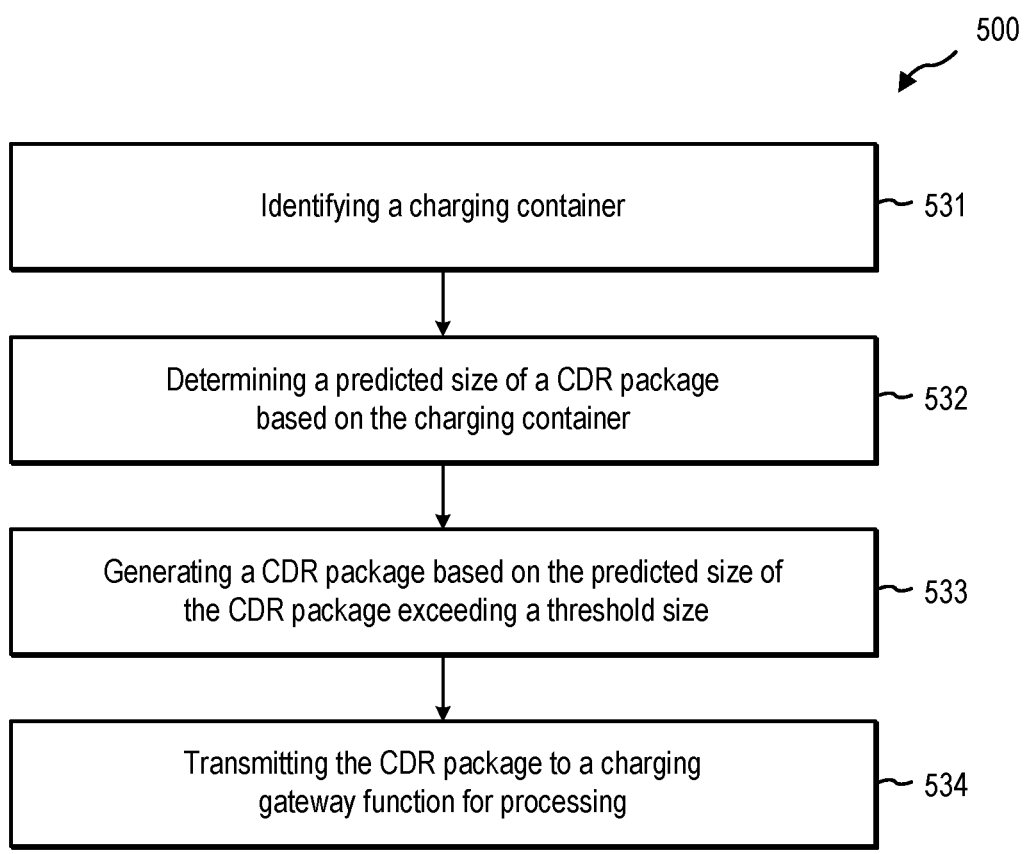
FIG. 5 illustrates an example series of acts related to predicting a size of a CDR and processing the CDR in accordance with one or more embodiments.

Turning now to FIG. 5, this figure illustrates example flowcharts including a series of acts 500 for predicting a CDR size, generating a CDR within a threshold size, and providing the CDR to a charging gateway function for processing. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can include instructions that, when executed by one or more processors, cause a computing device to perform the acts of FIG. 5. In still further embodiments, a system can perform the acts of FIG. 5.

As shown in FIG. 5, the series of acts 500 may include an act 531 of identifying a charging container. This may include detecting a container closing event associated with closing at least one charging container and adding the at least one charging container to a charging data record. The container closing event may include an expiration of a time-period associated with the charging container. In another example, the container closing event may include a maximum usage volume associated with the charging container. Detecting the container closing event may trigger adding a new container to the CDR package.

Identifying the charging container may include detecting a multi-container closing event. For example, the multi-container closing event may include a handoff of a subscriber device from one RAN component to another RAN component. In another example, the multi-container closing event may include movement of a subscriber device from a first coverage area (e.g., a first coverage area associated with a first RAN and/or first edge network) to a second coverage area (e.g., a second coverage area associated with a second RAN and/or second edge network). In another example, the multi-container closing event may include an expiration of a time-period applicable to multiple charging containers. In yet another example, the multi-container closing event may include a change in subscriber information. Detecting the multi-container closing event may trigger adding a plurality of new container to the CDR package. Identifying the charging container may include detecting any other trigger event.

The series of acts 500 may additionally include an act 532 of determining a predicted size of a CDR package based on the charging container. In one or more embodiments, the act 532 includes determining a predicted size of a charging data record package based on a predicted size of the at least one charging container associated with the container closing event. Determining the predicted size of the CDR package may include determining a predicted size of a base component of the CDR package. The base component may include a set of subscriber elements of the CDR package including information about a subscriber associated with the charging container. In another example, determining the predicted size of the CDR package may include determining a predicted size of a container component of the CDR package. The container component may include a set of container elements of the CDR package including information about resource usage associated with the charging container.

The series of acts 500 may further include an act 533 of generating the CDR package based on the predicted size of the CDR package exceeding a threshold size. The series of acts 500 may also include an act 534 of providing the CDR to a charging gateway function for processing. Generating the CDR package may include encoding the CDR package. The CDR package may be encoded prior to sending the CDR package to the charging gateway function for processing. Generating the CDR package may be based on the predicted size of the CDR package both exceeding the threshold size and being less than a maximum allowable size of CDR packages that the charging gateway function is configured to process.

In one or more embodiments, the telecommunications network is a fifth generation (5G) cellular network and the charging gateway function is a network function implemented in a core network of the 5G cellular network. One or more components of the systems described herein may be implemented on server nodes of an edge network of a cloud computing system.

Figure 6:
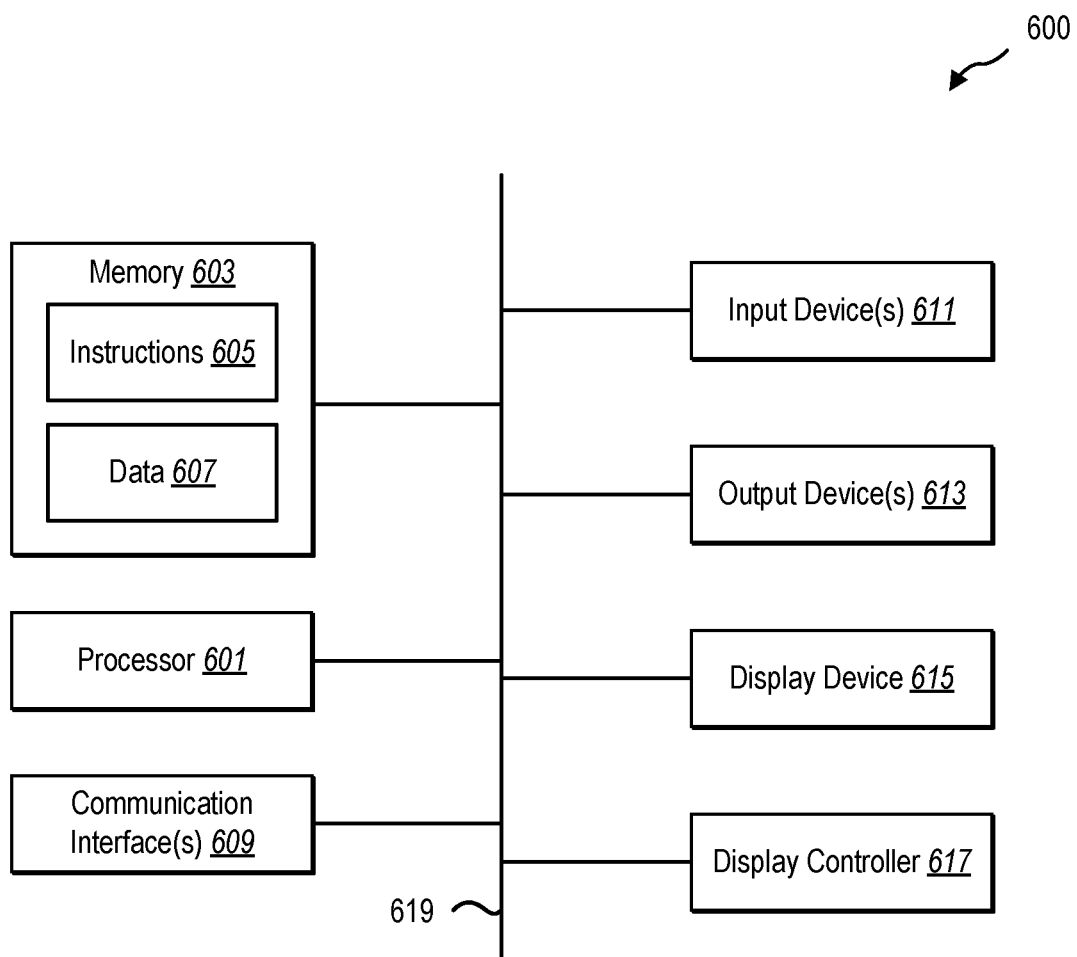
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a telecommunications network, a method for generating and transmitting charging data records to a charging gateway function, the method comprising:
   detecting a container closing event associated with adding at least one charging container to a charging data record;
   predicting, prior to generation of a charging data record package, a size of the charging data record package, wherein the prediction of the charging data record package is based on adding the at least one charging container to a base component of the charging data record package;
   generating the charging data record package based on determining that the predicted size of the charging data record package exceeds a threshold size of charging data record package; and
   transmitting the charging data record package to the charging gateway function for processing.

2. The method of claim 1, wherein detecting the container closing event includes detecting an event that triggers addition of a new charging container to an existing charging data record package including one or more previous generated charging containers.

3. The method of claim 2, wherein the container closing event includes one or more of:
   an expiration of a time period associated with the at least one charging container; or
   a maximum usage volume associated with the at least one charging container.

4. The method of claim 1, wherein detecting the container closing event includes detecting a multi-container closing event that triggers addition of a plurality of new charging containers to the charging data record package.

5. The method of claim 4, wherein the multi-container closing event includes one or more of:
   a handoff of a subscriber device from a first radio access network (RAN) component to a second RAN component;
   movement of the subscriber device from a first coverage area to a second coverage area;
   an expiration of a time period applicable to multiple charging containers; or a change in subscriber information.

6. The method of claim 1, wherein determining the predicted size of the charging data record package includes:
    determining a predicted size of the base component of the charging data record package; and
    determining a predicted size of a container component of the charging data record package.

7. The method of claim 6, wherein the base component includes a set of subscriber elements of the charging data record package including information about a subscriber associated with the charging container.

8. The method of claim 6, wherein the container component includes a set of container elements of the charging data record package including information about resource usage associated with the charging container.

9. The method of claim 1, wherein generating the charging data record package includes encoding the charging data record package prior to providing the charging data record package to the charging gateway function for processing.

10. The method of claim 1, wherein generating the charging data record package is based on the predicted size of the charging data record package both exceeding the threshold size and being less than a maximum allowable size of charging data record packages that the charging gateway function is configured to process.

11. The method of claim 1, wherein the telecommunications network is a fifth generation (5G) cellular network, and wherein the charging gateway function is a network function implemented in a core network of the 5G cellular network.

12. The method of claim 1, wherein the container closing event comprises a detected movement of a subscriber device from a first coverage area associated with a first edge network to a second coverage area associated with a second edge network.

13. In a telecommunications network, a system for generating and transmitting charging data records to a charging gateway function, the system comprising:
    at least one processor;
    memory in electronic communication with the at least one processor; and
    instructions stored in the memory, the instructions being executable by the at least one processor to:
        detect a container closing event associated with adding at least one charging container to a charging data record;
        predict, prior to generation of a charging data record package, a size of the charging data record package, wherein the prediction of the charging data record package is based on adding the at least one charging container to a base component of the charging data record package;
        generate the charging data record package based on determining that the predicted size of the charging data record package exceeds a threshold size of charging data record package; and
        transmit the charging data record package to a charging gateway function for processing.

14. The system of claim 13, wherein detecting the container closing event includes detecting an event that triggers addition of a new charging container to an existing charging data record package including one or more previous generated charging containers.

15. The system of claim 13, wherein determining the predicted size of the charging data record package includes:
    determining a predicted size of the base component of the charging data record package; and
    determining a predicted size of a container component of the charging data record package.

16. The system of claim 15, wherein the base component includes a set of subscriber elements of the charging data record package including information about a subscriber associated with the charging container.

17. The system of claim 13, wherein generating the charging data record package includes encoding the charging data record package prior to providing the charging data record package to the charging gateway function for processing.

18. The system of claim 13, wherein generating the charging data record package is based on the predicted size of the charging data record package both exceeding the threshold size and being less than a maximum allowable size of charging data record packages that the charging gateway function is configured to process.

19. In a fifth generation (5G) mobile network, a method for processing charging data records associated with usage of network functions on a core network of the 5G mobile network, the method comprising:
    detecting a container closing event associated with adding at least one charging container to a charging data record;
    predicting, prior to generation of a charging data record package, a size of the charging data record package, wherein the prediction of the charging data record package is based on adding the at least one charging container to a base component of the charging data record package; and
    generating the charging data record package based on determining that the predicted size of the charging data record package exceeds a threshold size of charging data record package, wherein generating the charging data record comprises encoding the charging data record package prior to providing the charging data record package to a charging gateway function.

20. The method of claim 19, wherein generating the charging data record package is based on the predicted size of the charging data record package both exceeding the threshold size and being less than a maximum allowable size of charging data record packages that the charging gateway function is configured to process.

* * * * *